United States Patent [19]
Lee

[11] Patent Number: 5,752,049
[45] Date of Patent: May 12, 1998

[54] INTEGRATED COMPUTER AND PRINTER SYSTEM AND METHOD FOR MANAGING POWER SOURCE THEREFOR

[75] Inventor: Dong-Ho Lee, Suwon, Rep. of Korea

[73] Assignee: Samsung Electronics Co., Ltd., Kyungki-do, Rep. of Korea

[21] Appl. No.: 621,183

[22] Filed: Mar. 21, 1996

[30] Foreign Application Priority Data

Mar. 31, 1995 [KR] Rep. of Korea ............... 7523/1995

[51] Int. Cl.$^6$ ............... G06F 15/20; B41J 11/58; H05K 7/16
[52] U.S. Cl. ............... 395/750.05; 364/707; 364/708.1; 395/750.08; 347/111
[58] Field of Search ............... 364/492, 708, 364/707, 708.1; 399/28; 400/83, 88; 361/395, 686, 687; 395/750, 114, 750.05, 750.08; 307/120; 347/111

[56] References Cited

U.S. PATENT DOCUMENTS

| | | |
|---|---|---|
| 4,667,289 | 5/1987 | Yoshida et al. . |
| 4,680,674 | 7/1987 | Moore . |
| 4,851,812 | 7/1989 | Holmberg . |
| 4,852,032 | 7/1989 | Matsuda et al. . |
| 5,020,926 | 6/1991 | Wilhelm . |
| 5,163,124 | 11/1992 | Yabe et al. . |
| 5,212,628 | 5/1993 | Bradbury . |
| 5,214,574 | 5/1993 | Chang . |
| 5,359,540 | 10/1994 | Ortiz . |
| 5,408,668 | 4/1995 | Tomai . |
| 5,408,669 | 4/1995 | Stewart et al. . |
| 5,428,798 | 6/1995 | Sekine et al. . |
| 5,442,512 | 8/1995 | Bradbury . |
| 5,443,320 | 8/1995 | Agata et al. . |
| 5,457,516 | 10/1995 | Kim . |
| 5,457,801 | 10/1995 | Aihara . |
| 5,528,346 | 6/1996 | Kim et al. . |

OTHER PUBLICATIONS

Cowart, Robert, Sybex Inc., Mastering Windows 3.1, Chapters 6 and 7, 1992.

Primary Examiner—Jack B. Harvey
Assistant Examiner—Rupal D. Dharia
Attorney, Agent, or Firm—Robert E. Bushnell, Esq.

[57] ABSTRACT

An integrated computer and printer system includes a unitary housing having a base jointed to substantially parallel side walls, front and rear surfaces; a back cover pivotally connected at one end of the rear surface of said unitary housing, for allowing access to an interior of the unitary housing; a computer unit contained in, and positioned on the base of the unitary housing; a display unit contained in, mounted to the front of the unitary housing, and electrically connected to, and controlled by the computer unit for providing a visual display of application program; and a printer unit contained in, installed at the rear of the unitary housing, and electrically connected to, and controlled by the computer unit for performing printing operation upon instruction by an operator. The integrated computer and printer system also includes a power source management program operable for saving power by selectively controlling the power supply to the computer unit and the printer unit corresponding to a use state of the computer unit.

30 Claims, 6 Drawing Sheets

INTEGRATED COMPUTER AND PRINTER SYSTEM AND METHOD FOR MANAGING POWER SOURCE THEREFOR

CROSS-REFERENCE TO RELATED APPLICATION

This application makes reference to, incorporates the same herein, and claims all benefits accruing under 35 U.S.C. §119 from an application for Computer Integrated With Printer, And Method For Managing Power Source Therefor earlier filed in the Korean Industrial Property Office on 31 Mar. 1994 and assigned Ser. No. 7523/1994.

BACKGROUND OF THE INVENTION

1. Technical Field

The present invention relates to a computer system, and particularly to an integrated computer and printer system and a method for managing a power source for such an integrated computer and printer system.

2. Background Art

Conventional computer system generally includes a computer main body, input devices such as, for example, a key board, a mouse or the like, output devices such as, for example, a CRT or liquid crystal display unit, a printer, a plotter or the like, and auxiliary memory devices such as a floppy disc drive, a hard disc drive and the like. The computer main body and the auxiliary memory devices are formed in a unitary unit, while the display unit is either integrated with the computer main body or is mounted on the computer main body. The printer which is an quintessential accessory for use with a computer, is generally installed separately from the computer main body. The printer must be mounted separately, and connected and disconnected from the computer and from a power source each time it is used and moved. Other printer inconveniences also arise in situations in which space is limited, and with computers that are mounted on racks. If space is limited, additional surface area required by the printer can rival that required by the computer itself. Similarly, if the computer is rack mounted, a separate rack must usually be dedicated to the printer. Moreover, if the printer is installed at a considerable distance from the computer, the operator has to inconveniently go to the printer to supply papers and activate the printer for use with the computer.

In an effort to package a computer and various computer peripherals such as a printer in a more compact and portable form, computer manufacturers have endeavored to integrate the printer in a compact work station or a computer itself. For example, in U.S. Pat. No. 5,212,628 for Modular Portable Work Station Having A Movable Support Tray and U.S. Pat. No. 5,442,512 for Modular Portable Computer Work Station Selectively Powered By Either An Internal Battery, An Internal Battery Charger, Or An External DC Input issued to Brabury, and U.S. Pat. No. 5,214,574 for Portable Computer Housing In Combination With A Portable Computer issued to Chang, a portable computer and printer are integrated and operated within a compact portable carrying case. In another example, U.S. Pat. No. 4,689,674 for Modular Computer System With Integral Electronic Bus issued to Moore, and U.S. Pat. No. 4,852,032 for Compact Electronic Computer issued to Matsuda et al. both seek to secure a printer to the back of the computer main body so that the printer can easily be transported as part of the integral unit. These computer and printer arrangements, however, are neither completely portable nor integrated in a unitary structure.

In another attempt to arrange a printer as an integral component of a computer is disclosed in U.S. Pat. No. 5,020,926 for Printer Mounting Arrangement issued to Wilhelm. In Wilhem '926, a printer is either fixedly mounted in an industry standard drive bay of a computer, or is slidably mounted in the drive bay so as to slide between first and second positions. In the first position, the printer is disposed within the computer case. In the second position, the printer is disposed outside the case and is available for use. While the computer and printer arrangement of Wilhem '926 does offer portability and convenience to the operator, it is my observation that the sizes of the computer case and the printer tend to be disproportionate. Further, it is my opinion that the computer and the printer are not fully integrated in a unitary structure.

SUMMARY OF THE INVENTION

Accordingly, it is therefore an object of the present invention to provide a novel integrated, compact computer and printer system.

It is also an object of the present invention to provide a fully integrated computer and printer system having a unitary structure.

It is another object of the present invention to provide an integrated computer and printer system capable of minimizing power consumption.

It is further an object of the present invention to provide a method for managing power source of an integrated computer and printer system having a unitary structure in order to efficiently reduce power consumption.

It is yet another object of the present invention to provide a power saving method for an integrated computer and printer system capable of performing a wake-up operation for printing in response to a command from a computer during a power saving mode.

These and other objects of the present invention may be achieved by an integrated computer and printer system including a unitary housing having a base jointed to substantially parallel side walls, front and rear surfaces; a back cover pivotally connected at one end of the rear surface of the unitary housing, for allowing access to an interior of the unitary housing; a computer unit contained in, and positioned on the base of the unitary housing; a display unit contained in, mounted to the front of the unitary housing, and electrically connected to, and controlled by the computer unit for providing a visual display of application program; and a printer unit contained in, installed at the rear of said unitary housing, and electrically connected to, and controlled by the computer unit for performing printing operation upon instruction by an operator. The printer unit is constructed by a process cartridge detachably mounted on the back cover pivotally connected at one end of the unitary housing, and positioned in the unitary housing for forming images on a succession of individual sheet of recording papers upon a print command, when the back cover is closed to cover the unitary housing; a convey device for conveying each individual sheet of recording papers to an image forming section in a vertical direction where the process cartridge forms images on the recording papers upon reception of the print command; and a transport device for delivering the individual sheet of recording papers processed by the process cartridge to a paper discharge tray formed on a top surface of the unitary housing.

The method for managing power source of the integrated computer and printer system constructed according to the principles of the present invention includes the steps of:

turning on power to operate an engine controller of a printer and a display unit by a computer during a power-on and checking whether the system is in a power saving mode; sending a power saving control signal to the engine controller upon initiation of a power saving mode and checking whether the system is in a wake-up mode; transmitting a wake-up control signal to the engine controller of the printer in response to a print command of the operator; initializing by the engine controller of the printer in response to the power-on and setting the system in a standby mode; checking whether a printing command, a power saving control signal, and a wake-up signal are received from the computer; executing a wake-up call and performing printing operation upon receipt of a print command from the computer, and then setting the system in a standby mode; executing a power saving mode upon receipt of a power saving control signal from the computer; executing a wake-up call upon receipt of a wake-up control signal from the computer, and then setting the system in a standby mode; and executing a power source managing mode when there is no signal from the computer.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
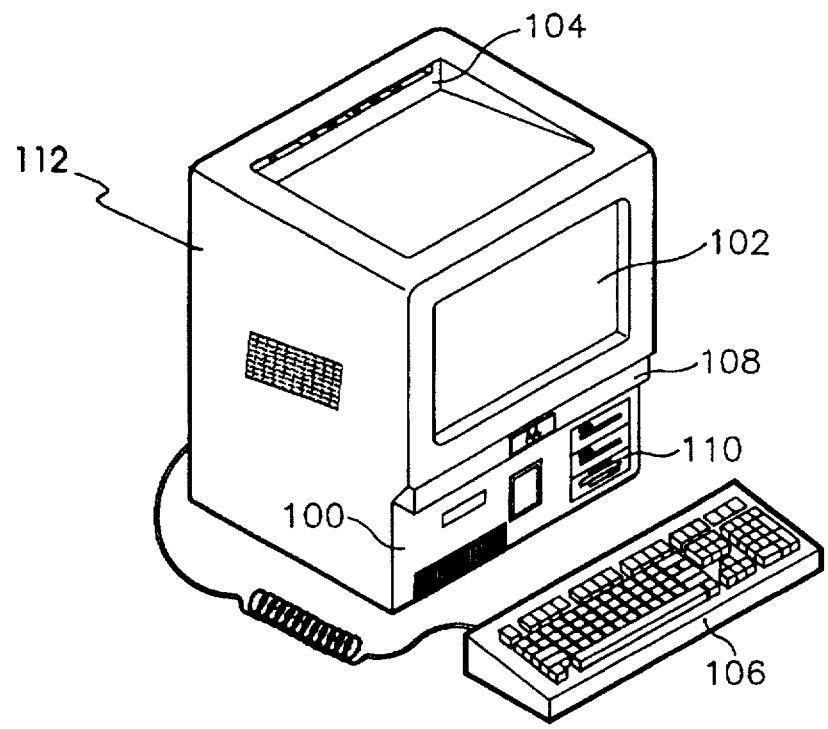
FIG. 1 is a perspective view illustrating an integrated computer and printer system constructed according to the principles of the present invention.

Referring now to the drawings and particularly to FIG. 1, which illustrates an integrated computer and printer system constructed according to the principles of the present invention. The printer unit of the integrated computer and printer system as contemplated by the present invention is a laser beam printer using an electrophotographic developing technique. The integrated computer and printer system of FIG. 1 has a housing including therein a computer main body 100 for containing a system main board supporting internal computer components such as, for example, a central processing unit (CPU), memory cards etc . . . , a keyboard 106, auxiliary memory devices 110 such as a 3.5" floppy disk drive, a 5.25" floppy disk drive, and a hard disk drive (not shown). A display unit 102 is mounted on the computer main body 100 for providing a visual display of data operation. A paper supply cassette 108 is detachably installed between the computer main body 100 and the display unit 102 for containing a stack of recording papers. From a visual standpoint, the paper supply cassette 108 is positioned higher than a key board 106, when observed by an operator so that the paper supply cassette 108 can be conveniently removed or slid forward and backward from the computer main body 100 for enabling the operator to load the recording papers into the cassette 108 while the operator is operating the computer. A printer unit 104 is installed at the rear of the display unit 102 in a manner that the transporting of recording of papers is accomplished in a vertical direction. That is, individual sheet of recording papers is picked up from the paper supply cassette 108 and fed upward in a vertical direction for printing and for subsequent discharge on a paper discharge tray integrally constructed on the top surface of the housing. On each side of the integrated computer and printer system, there is an air vent 112 and a blowing fan (not shown) typically installed for providing ventilation after each printing operation.

Figure 2:
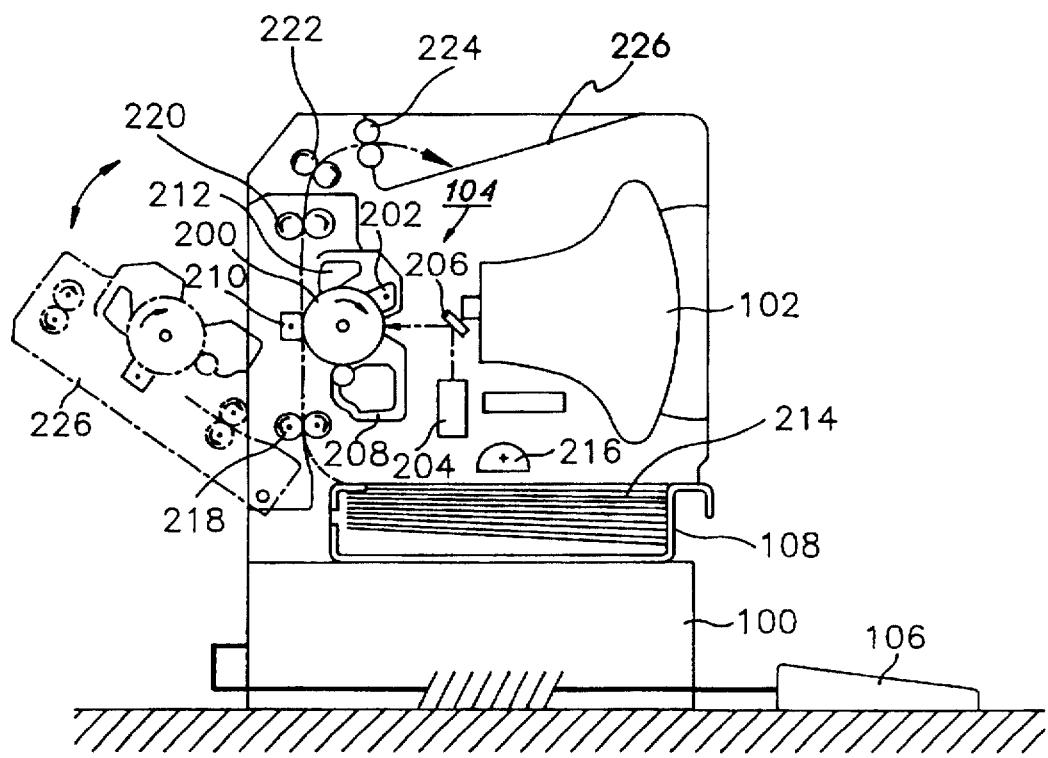
FIG. 2 is a sectional side view illustrating a construction of a printer unit of the integrated computer and printer system according to the present invention.

FIG. 2 illustrates a construction of the printer unit 104 as contemplated by the present invention. The basic printer unit 104 as described is a laser beam printer generally known in the art. The configuration of the laser beam printer as constructed in the integrated computer and printer system is, however, different. For example, a cover 226 is integrated with a photosensitive drum 200, a charging device 202, a developer 208, a transfer device 210, a cleaner 212, a register roller 218, and a fixing device 220. The cover 226 is installed in the back of the integrated computer and printer system, and is pivotally connected at a lower end of the back portion for allowing opening and closing of the printer unit 104 in a rearward direction.

Referring to FIG. 2, the printer unit 104 as contemplated by the present invention includes a stack of recording papers 214 contained in the paper supply cassette 108; an optical assembly using a light source 204, a reflecting mirror 206 and an imaging lens (not shown); an image forming assembly constructed with a photosensitive drum 200, a charging device 202, a developing unit 208, a transfer device 210, a cleaning device 212; a paper transport assembly having a pick-up roller 216 for picking up individual sheet of recording papers contained in the paper supply cassette 108, a pair of registration rollers 218 from an upstream side along a direction of transport of the individual sheet of the recording paper. The paper transport assembly also includes a transport guide (not shown), a fixing device 220, and two pairs of discharge rollers 222, 224, and a paper discharge tray 226 and the like so as to transport and discharge the recording paper separated from the photosensitive drum 200. The image forming assembly is preferably constructed in a form of a detachable process cartridge so that it can be easily installed and removed for replacement of individual component such as a developing unit from the printer unit 104.

when the cover 226 is open from the rear as shown in FIG. 2. Further, the process cartridge is preferably fabricated by hard plastic or alike serving as a shield to prevent the magnet in the cartridge from affecting or otherwise destroying the image memory in the display unit 102, or the contents in the auxiliary memory devices 110.

Typically, the surface of the photosensitive drum 200 uniformly charged by corona or other form of discharge from the charging device 25, and an electrostatic latent image is formed on the surface of the photosensitive drum 200 by way of light irradiation from a light-emitting diode LED or a laser diode from the light source to a charged portion of the photosensitive drum 200. The electrostatic latent image is developed by toner while passing through the developing unit 208, and is then formed as a visual image. The visual image on the photosensitive drum 200 is transferred on the recording paper 214, which is fed from the paper supply cassette 108 and into the printer unit 104 by the pick-up roller 216 and the pair of registration rollers 218 by way of the transfer device 210.

Then, the recording paper 214 is attached to the photosensitive drum 200 by an electrostatic force, and then subsequently separated from the photosensitive drum 200 by the transfer device 210 to be transported by the transport guide (not shown) into the fixing device 220 where the toner image transferred onto the recording paper 214 by the transfer device 210 is permanently fixed onto the recording paper 214. The fixing device typically includes a heat generator (e.g., a halogen lamp) for generating heat, a heat controller (e.g., a thermostat and thermistor) for controlling the heat generated, a heating roller having an outermost surface for engaging the recording paper 214 and an innermost surface coated with an infrared radiation material for absorbing heat, and a pressure roller for applying pressure upon the recording paper 214 as the recording paper 214 passes between the heating roller and the pressure roller. There, the image of the document is fixed on the recording paper 214 by the combination of heat and pressure, and thus the desired image forming operation is accomplished. After each printing operation, however, residual toner and latent image remain on the photosensitive drum 200. The toner remaining on the photosensitive drum 200 is typically removed by a cleaning blade of the cleaning unit 212, and the latent image remaining on the photosensitive drum 200 is removed by a pre-erase lamp array (not shown). After each printing operation, the recording paper 214 is discharged to the discharge tray 226 on the top surface of the integrated computer and printer system by way of paper discharge rollers 222 and 224.

Figure 3:
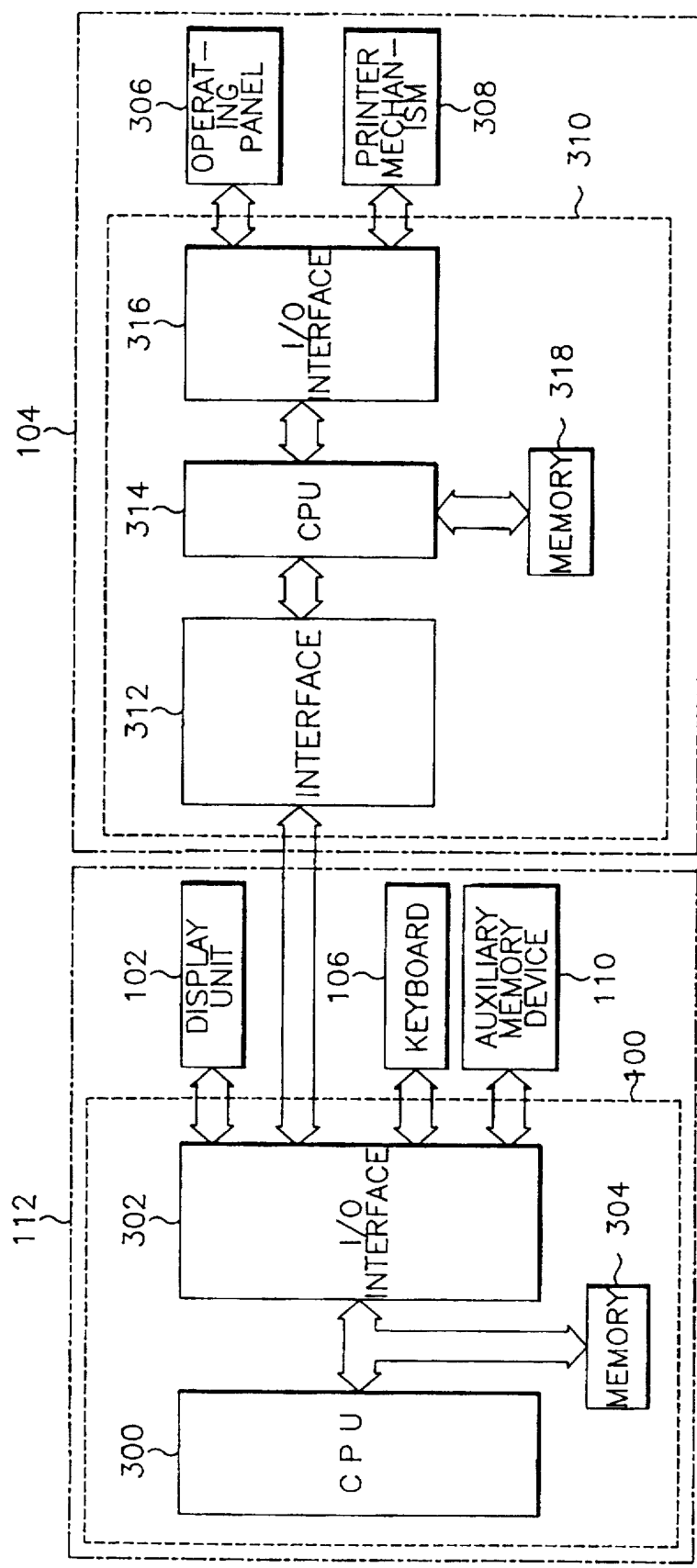
FIG. 3 is a block diagram illustrating a construction of a computer unit of the integrated computer and printer system according to the present invention.

Turning now to FIG. 3 which illustrates a circuit construction of the integrated computer and printer system according to the present invention. As shown in FIG. 3, the computer unit 112 includes a computer main body 100, a display unit 102, a keyboard 106, and auxiliary memory devices 110 such as, for example, a 3.5" floppy disk drive, a 5.25" floppy disk drive, and a hard disk drive (not shown). The computer main body 100 typically contains a central processing unit (CPU) 300, an input/output (I/O) interface 302, and a memory, and is connected to the display unit 102, the printer unit 104, the key board 106 and the auxiliary memory devices 110 for data processing.

The printer unit 104, on the other hand, includes an operating panel 306 having a plurality of input keys and visual displays; a printer mechanism 308 constructed as shown in FIG. 2; and an engine controller 310 connected to the computer main body 100 for controlling the printer mechanism 308.

The engine controller 310 includes a central processing unit (CPU) 314; an interface card connected between the CPU 314 and the I/O interface 302 of the computer main body 100, for interfacing the signal transmission and reception between the printer unit 104 and the computer unit 112; a memory device 318 containing a read-only-memory (ROM) for storing application programs to the printer mechanism 308, and a random-access-memory (RAM) for temporarily storing data generated from the application program; and an I/O interface 316 connected between the CPU 314, the operating panel 306 and the printer mechanism 308, for interfacing the input/output signals.

If an operator presses a print command through the key board 106 while viewing the display unit 102 of the computer 112, the CPU 300 of the computer main body 100 exchanges various control signals with the engine controller 310 through the I/O interface 302. Then the print data is transmitted to the printer unit 104 to execute the printing operation. Further, as contemplated by the present invention, an additional interface card may be installed in the integrated computer and printer system of FIG. 2 in order to link with another printer external to the integrated computer and printer system for printing when necessary in the event that the internal printer unit 104 needs to be repaired or the process cartridge of the printer unit 104 needs to be replaced.

Figure 4:
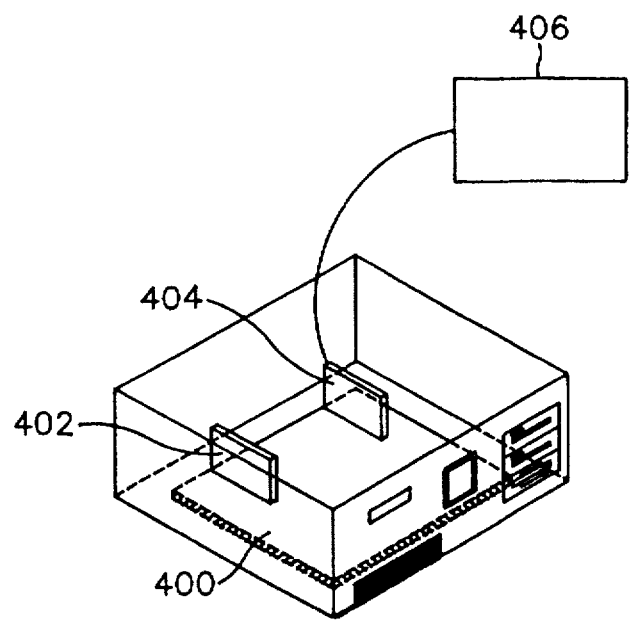
FIG. 4 illustrates the installation of an inner interface card for the printer unit of the integrated computer and printer system and an outer interface card for a printer unit external to the integrated computer and printer system constructed according to the present invention.

FIG. 4 illustrates the installation of an inner interface card 402 for the printer unit of the integrated computer and printer system and an outer interface card 404 for a printer unit 406 external to the integrated computer and printer system of FIG. 2. The inner interface card 402 is connected to the interface 312 of the printer unit 104, so that the printer unit 104 can be operated under control of the computer unit 112. The outer interface card 404 is connected to the external printer unit 406 when necessary. The inner and outer interface cards 402 and 404 are included in the I/O interface 302 of the computer main body 100. Moreover, the inclusion of a plurality of boards on the system main board 400 the computer main body 100 for operating the computer unit 112 is well known in the art and need not repeated herein. If, however, the inner and outer interface cards 402 and 404 are installed on the system main board, both the internal printer unit 104 and the external printer unit 406 need to be individually selected by the operator before printing operation can begin.

Figure 5:
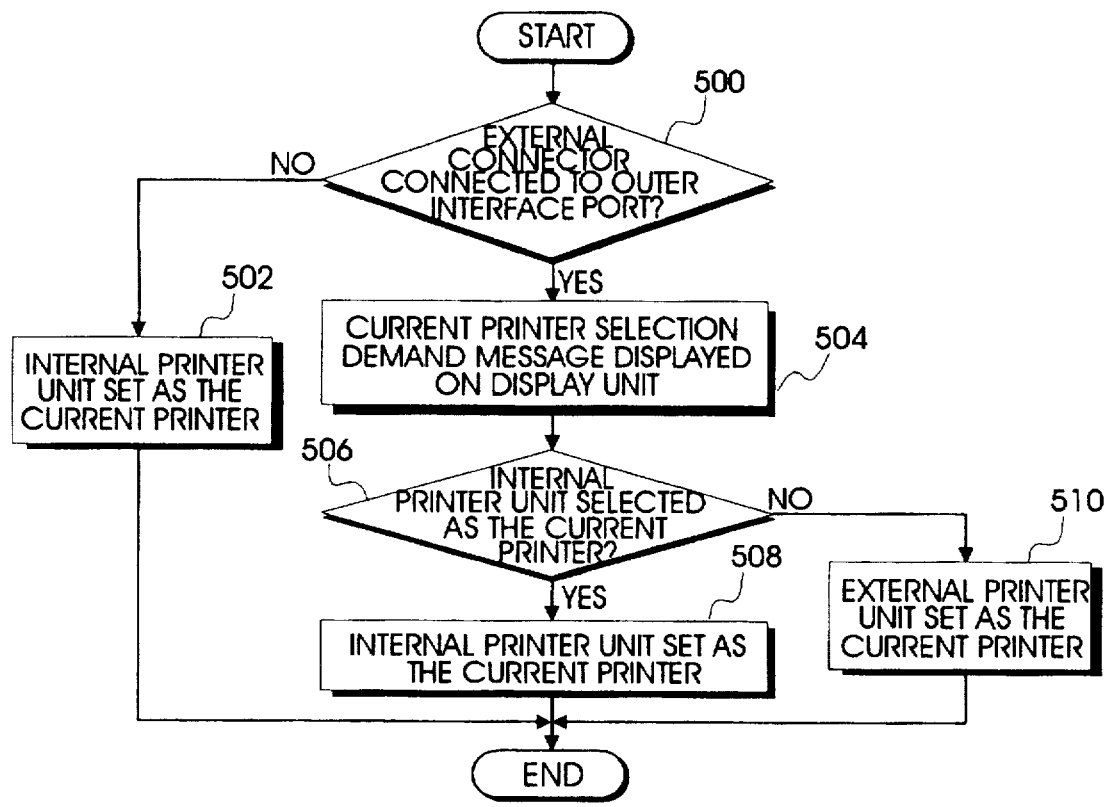
FIG. 5 is a flow chart illustrating the setting of the current printer unit for use in the integrated computer and printer system according to the present invention.

FIG. 5 is a flow chart for the CPU 300 of the computer main body 100 for the current setting of the printer unit according to the present invention. Referring to FIG. 5, the CPU 300 first determines whether an external connector from an external printer unit 406 is connected to an outer interface port for each printing operation at step 500. If the external connector from the external printer unit 406 is not connected to the outer interface port, the CPU 300 determines that the inner printer unit 104 of the integrated computer and printer system is set as the current printer for printing at step 502.

If, on the other hand, the external connector from the external printer unit 406 is connected to the outer interface port, the CPU 300 provides a visual display of a message requiring the operator to select a current printer on the display unit 102 at step 504. Once the current printer selection message is displayed on the display unit 102, the operator must select whether the document is to be printed by the internal printer unit 104 of the integrated computer and printer system or by the external printer unit 406. Based on this selection, the CPU 300 determines whether the internal printer unit 104 has been selected by the operator through the keyboard 106 as the current printer for printing the document at step 506. If the internal printer unit 104 has been selected by the operator as the current printer, the CPU 300 sets the internal printer unit 104 as the current printer for printing the document at step 508. Otherwise, the CPU 300 sets the external printer unit as the current printer for printing the document at step 510.

For the sake of the convenience, it will be assumed herein that the internal printer unit 104 is set as the current printer, the power source is adaptively managed in accordance with the operational status of the computer unit 112 and the printer unit 104 of the integrated computer and printer system constructed according to the present invention.

Figure 6:
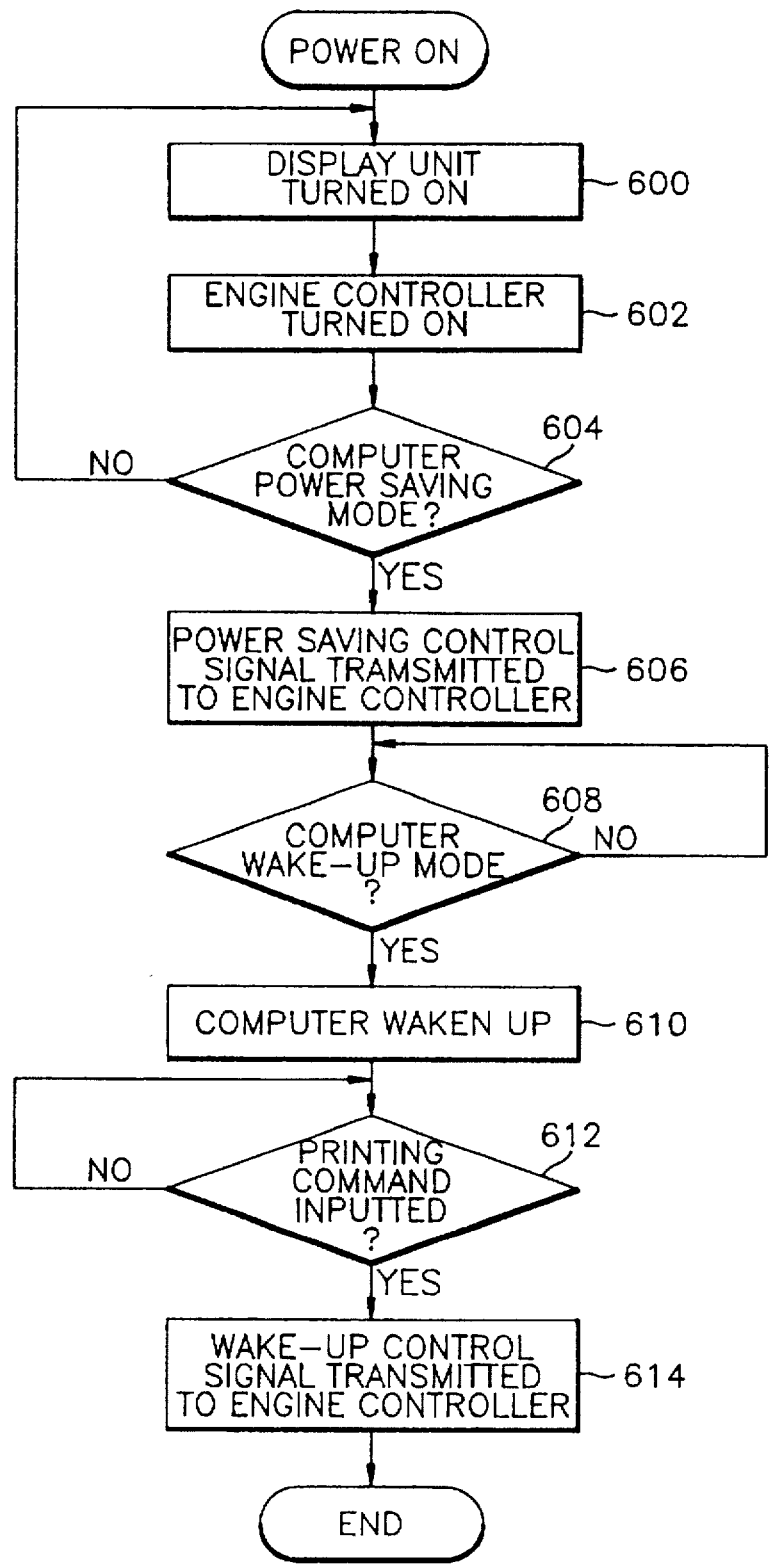
FIG. 6 is a flow chart illustrating the power source management for the integrated computer and printer system according to the present invention.

FIG. 6 is a flow chart for the power source management for the integrated computer and printer system constructed according to the present invention. Referring to FIG. 6, the power source management operation will be described as follows. Once the operator turns on the main power switch of the computer unit 112, the computer main body 1on the power source of t 300 then turns on the power source of the display unit 102 at step 600, and concomitantly turns on the power source of the engine controller 310 of the printer unit 104 at step 602. Under this condition, however, the fixing device and the blowing fan which consume much power in the printer unit 104 are not needed to be turned on in order to save power. Instead, they are to turn on only during printing operation. Under this condition, if the operator does not use the computer unit 112 after a certain time period has elapsed, the CPU 300 turns the computer unit 112 into a power saving mode in order save the power consumption, by turning off large power consuming components. Once the computer unit 112 is set in the power consumption saving mode at step 604, the CPU 300 also transmits a power saving control signal to the engine controller 310 of the printer unit 104 in order to concomitantly set the printer unit 104 in the power saving mode as well.

This power saving mode scheme is described in detail in a related U.S. patent application for "POWER SAVING DEVICE FOR USE IN PERIPHERAL EQUIPMENT OF A COMPUTER", earlier filed on 31 Dec. 1993 and now issued as U.S. Pat. No. 5,483,464, and in U.S. patent application for "METHOD AND CONTROL APPARATUS FOR GENERATING POWER SOURCE MANAGEMENT SIGNALS OF COMPUTER PERIPHERAL EQUIPMENT IN A COMPUTER SYSTEM", earlier filed on 1 Aug. 1994 and assigned with Ser. No. 08/283,759, which are incorporated by reference herein. For example, the CPU 300 of the computer unit 112 as disclosed in U.S. Pat. No. 5,483,464 as incorporated by reference, may generate a power saving control signal for controlling the supply of power to a computer's peripheral equipment i.e., the engine controller of the printer unit 104 based on a determination of whether the computer has not been used for a predetermined time period so that needless consumption of power of the peripheral equipment can be reduced.

After the integrated computer and printer system is in the power saving mode at step 606, however, the operator may instruct the computer unit 112 to wake-up for computer operation at step 608. If the operator instructs the computer unit 112 to wake-up after a period of non-use by way of operating the keyboard 106 for example, the computer unit 112 alone wakes up at step 610. Not until a print command is input from the computer unit 112 at step 612, does the printer unit 104 wake up to perform the printing operation. That is, when the operator presses a print command by way of the keyboard 106, the CPU 300 of the computer unit 112 transmits a wake-up control signal to the engine controller 310 of the printer unit 104 to begin the printing operation at step 614. Under this condition, the engine controller 310 can wake up the printer unit 104 in response to instruction of the operator. Without such instruction from the operator however, the printer unit 104 maintains in the power saving mode regardless whether the computer unit 112 is awaken.

Figure 7:
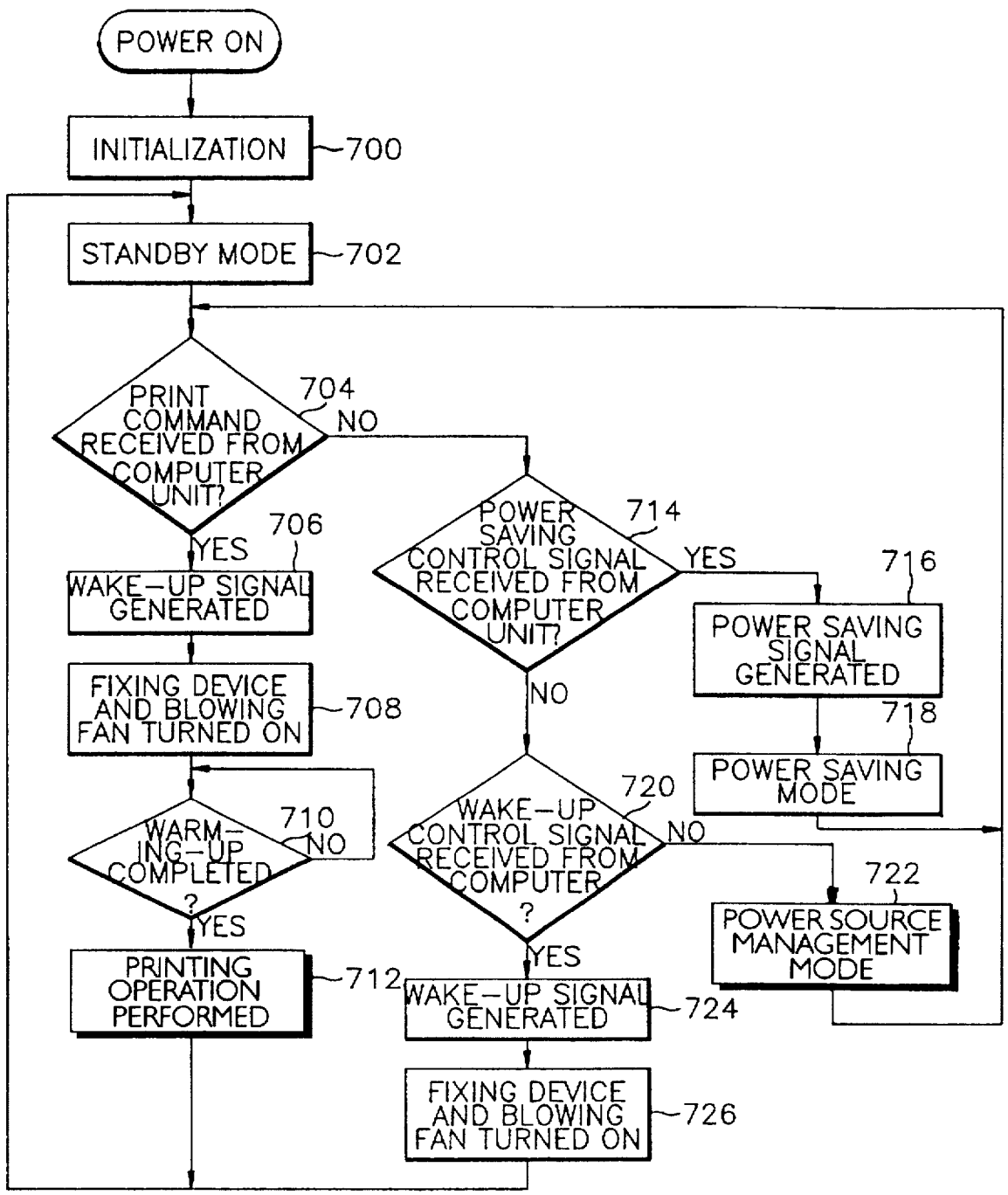
FIG. 7 is a flow chart illustrating a first embodiment of the power source management for the printer unit of the integrated computer and printer system according to the present invention.

FIG. 7 is a flow chart illustrating a first embodiment of the power source management for the printer unit 104 of the integrated computer and printer system according to the present invention. Referring to FIG. 7, the CPU 314 of the engine controller 310 performs an initializing operation at step 700 when the power is turned on. Once the printer unit 104 is initialized, the printer unit 104 is set in a standby mode at step 702.

Thereafter, the CPU 314 of the engine controller 310 determines whether a print command is received from the computer unit 112 through the interface 312 at step 704. If a print command is received from the computer unit 112, the CPU 314 of the engine controller 310 generates a wake-up signal at step 706 to turn on and warm up the high power consumption units such as the fixing device and blowing fan at step 708. Once the fixing device and the blowing fan are turned on for a short time period and the warm up operation is completed at step 710, the printer unit 104 performs the printing operation at step 712. After each printing operation, the printer unit 104 returns to the standby mode at step 702 awaiting for the next print command.

If, on the other hand, the print command is not received from the computer unit 112 at step 704, the CPU 314 of the engine controller 310 determines whether a power saving control signal is received from the computer unit 112 at step 714. If a power saving control signal is received from the computer unit 112, the CPU 314 of the engine controller 310 then generates a power saving signal at step 716 so that the printer unit 104 is set in a power saving mode at step 718. Once the printer unit 104 is set in the power saving mode, the CPU 314 of the engine controller 310 returns to wait for the next print command.

If a power saving control signal is not received from the computer unit 112 at step 714, however, the CPU 314 of the engine controller 310 determines whether a wake-up control signal is received from the computer unit 112 at step 720. When a wake-up control signal is received from the computer unit 112, the CPU 314 of the engine controller 310 generates a wake-up signal at step 724 to turn on and warm up the fixing device and blowing fan at step 726. Once the fixing device and the blowing fan are warmed up, the printer unit 104 returns to the standby mode at step 702 awaiting for the next print command.

If, on the other hand, a wake-up control signal is not received from the computer unit 112 at step 720; that is, if signals such as a print command from the computer 112, a power saving control signal, or a wake-up control signal are not received, then the printer unit 104 is set to a power source management mode at step 722 in which, if the operator does not input a print command for a certain time period, e.g., for 15 minutes, the printer unit 104 sets itself to a power saving mode, so that the fixing device 220 and the blow fan can be disconnected from the power source in order to reduce power consumption. After the printer unit 104 is set to the power source management mode at step 722, the printer unit 104 returns to step 704 waiting for the next print command.

The technique of performing a wake-up operation for the printer unit 104 is described in detail in another co-pending, now allowed U.S. patent application for "A POWER-SAVING PRINTING METHOD OF A PRINTING SYSTEM", earlier filed on 30 Dec. 1994, there assigned with Ser. No. 08/366,599, and in U.S. patent application for "POWER SAVING METHOD OF AN IMAGE FORMING APPARATUS", earlier filed on 24 Apr. 1995, there assigned with Ser. No. 08/429,422, which are incorporated by reference herein. For example, in the allowed U.S. patent application for "A POWER-SAVING PRINTING METHOD OF A PRINTING SYSTEM" assigned to the same assignee of this application, the CPU 300 of the computer unit 112 may transmit a dummy print code which does not cause an actual printing operation while the printer unit 112 is in the power saving mode in order to perform a wake-up operation. Alternatively, in another wake-up scheme as disclosed in U.S. patent application for "POWER SAVING METHOD OF AN IMAGE FORMING APPARATUS", the CPU 300 of the computer unit 112 may begin a timing operation when the printer unit 104 is in a power saving mode, determine whether a print command is received from the operator during the timing operation, warm up the printer unit 104 to a standby state for preparation of a printing operation when either print data is received for printing while the printer unit 104 is in the power saving mode or a duration of the timing operation exceeds a predetermined time period.

Meanwhile, when a wake-up control signal is received from the computer unit 112, the wake-up operation of the printer unit 104 can be performed by instruction of the operator or a system engineer. FIG. 7 illustrates an example in which, when a wake-up control signal is received from the computer 112, the printer unit 104 is also set in a wake-up mode.

Figure 8:
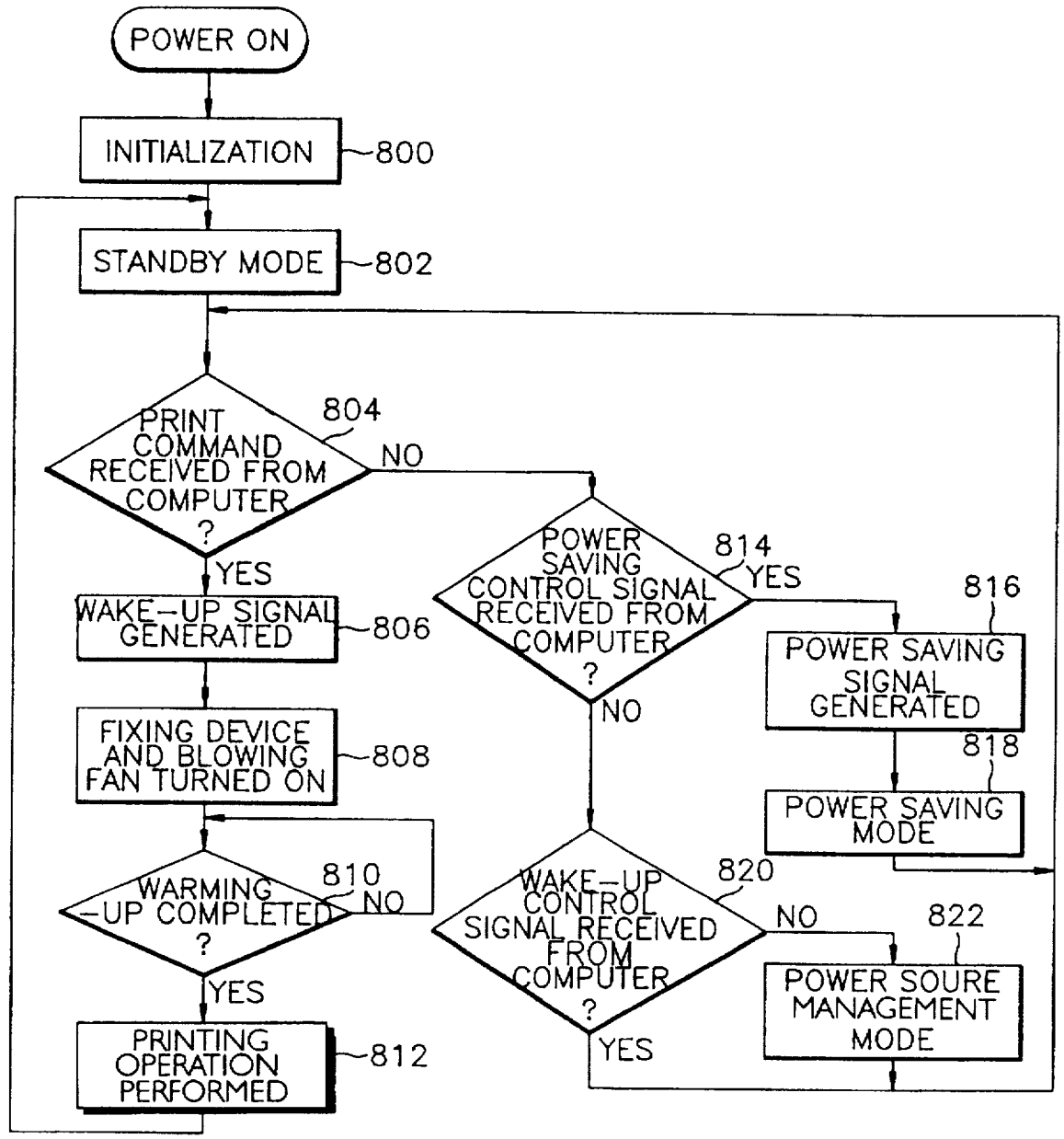
FIG. 8 is a flow chart illustrating a second embodiment of the power source management for the printer unit of the integrated computer and printer system according to the present invention.

FIG. 8 illustrates another example in which, even when a wake-up control signal is received from the computer unit 112, however, the printer unit 104 needs not be awaken for preparation of printing unless a print command is received from the computer unit 112. Referring to FIG. 8, the CPU 314 of the engine controller 310 is initialized at step 800 when the power is turned on. Once the printer unit 104 is initialized, the printer unit 104 is set in a standby mode at step 802. Thereafter, the CPU 314 of the engine controller 310 determines whether a print command is received from the computer unit 112 through the interface 312 at step 804. If a print command is received from the computer unit 112, the CPU 314 of the engine controller 310 generates a wake-up signal at step 806 to turn on and warm up the high power consumption units such as the fixing device and blowing fan at step 808. Once the fixing device and the blowing fan are turned on for a short time period and the warm up operation is completed at step 810, the printer unit 104 performs the printing operation at step 812. After each printing operation, the printer unit 104 returns to the standby mode at step 802 awaiting for the next print command.

If, on the other hand, the print command is not received from the computer unit 112 at step 804, the CPU 314 of the engine controller 310 determines whether a power saving control signal is received from the computer unit 112 at step 814. If a power saving control signal is received from the computer unit 112, the CPU 314 of the engine controller 310 then generates a power saving signal at step 816 so that the printer unit 104 is set in a power saving mode at step 818. Once the printer unit 104 is set in the power saving mode, the CPU 314 of the engine controller 310 returns to wait for the next print command.

If a power saving control signal is not received from the computer unit 112 at step 814, however, the CPU 314 of the engine controller 310 determines whether a wake-up control signal is received from the computer unit 112 at step 820. In this situation, if a wake-up control signal is received from the computer unit 112, the CPU 314 of the engine controller 310 returns to the standby mode at step 802 awaiting for the next print command without warming up the fixing device and turning on the blowing fan. When a wake-up control signal is not received from the computer unit 112 at step 820, however, the printer unit 104 is set to a power source management mode at step 822 in which, if the operator does not input a print command for a certain time period, e.g., for 15 minutes, the printer unit 104 sets itself to a power saving mode, so that the fixing device 220 and the blow fan can be disconnected from the power source in order to reduce power consumption. After the printer unit 104 is set to the power source management mode at step 822, the printer unit 104 returns to step 804 waiting for the next print command.

According to the present invention as described above, the integrated computer and printer system has a portable unitary structure and is capable of efficiently controlling a power supply for both the computer unit and the printer unit in order to minimize power consumption. The power saving scheme advantageously reduces power consumption while effectively preparing the printer unit to begin printing operation without delay.

While there have been illustrated and described what are considered to be preferred embodiments of the present invention, it will be understood by those skilled in the art that various changes and modifications may be made, and equivalents may be substituted for elements thereof without departing from the true scope of the present invention. For example, while the present invention describes a laser beam printer as being integrated with a computer, ink jet printer, LED printer and the like may also be integrated with the computer without special modifications. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An integrated computer and printer system, comprising:

a unitary housing having a base joined to substantially parallel side walls, front and rear surfaces;

a back cover pivotally connected at one end of the rear surface of said unitary housing, for allowing access to an interior of said unitary housing;

a computer unit contained in, and positioned on the base of said unitary housing;

a display unit contained in, and mounted to the front of said unitary housing, said display unit being electrically connected to, and controlled by said computer unit for providing a visual display of application programs; and a printer unit contained in, and installed at the rear of said unitary housing, said printer unit being electrically connected to, and controlled by said computer unit for performing a printing operation upon instruction by an operator, said printer unit comprising:

a process cartridge detachably mounted on the back cover pivotally connected at one end of said unitary housing, and positioned in said unitary housing for forming images on a succession of individual sheets of recording paper upon a print command, when the back cover is closed to cover said unitary housing;

means coupled to receive individual sheets of recording paper from a paper cassette, for conveying each individual sheet of recording paper to an image forming section in a vertical direction where said process cartridge forms images on each individual sheet of said recording paper upon said print command; and means for delivering each individual sheet of recording paper processed by said process cartridge to a paper discharge tray formed on a top surface of said unitary housing.

2. The integrated computer and printer system of claim 1, further comprised of said process cartridge comprising:

a photosensitive drum for forming a latent image;

a charging device having a charging wire extending in an axial direction of said photosensitive drum, for applying an electrical charge to said photosensitive drum to form said latent image;

a developing device for developing said latent image formed on said photosensitive drum to a toner image to be transferred on each individual sheet of recording papers;

a cleaning device adapted for cleaning a circumferential surface of said photosensitive drum after each printing operation; and a frame for supporting said photosensitive drum, said charging device, said developing device, and said cleaning device.

3. The integrated computer and printer system of claim 1, further comprised of said paper cassette of said printer unit being detachably installed between said computer unit and said display unit for containing a stack of recording paper.

4. The integrated computer and printer system of claim 2, further comprised of a blowing fan installed in the side wall of said unitary housing for generating an air current flowing along a direction substantially perpendicular to the photosensitive drum, when said back cover is closed to cover said unitary housing.

5. The integrated computer and printer system of claim 1, further comprised of said computer unit comprising an inner interface card connected to said printer unit for controlling said printer unit to perform said printing operation directly under instruction of the operator, and an outer interface card connectable to an external printer system separated from said integrated computer and printer system for enabling said external printer system to perform said printing operation when the operator selects said external printer system for printing a desired document.

6. The integrated computer and printer system of claim 5, further comprised of said computer unit performing each printing operation by:

determining whether the external printer system is connected to the outer external interface card;

setting the printer unit constructed in said integrated computer and printer system as a current printer for performing the printing operation, when the external printer system is not connected to the outer interface card; and setting one of the printer unit and the external printer system as the current printer for performing the printing operation, when the external printer system is connected to the outer interface card.

7. The integrated computer and printer system of claim 6, further comprised of said display unit providing a visual display of a message alerting the operator to select the current printer for performing the printing operation from one of the printer unit constructed in said integrated computer and printer system and the external printer system externally connected to said integrated computer and printer system for each printing operation.

8. The integrated computer and printer system of claim 7, further comprised of said computer unit setting one of the printer unit and the external printer system as the current printer for performing the printing operation by:

determining whether the printer unit constructed in said integrated computer and printer system is selected by the operator as the current printer;

setting the printer unit constructed in said integrated computer and printer system as the current printer for performing the printing operation, when said printer unit is selected by the operator; and alternatively, automatically setting the external printer system as the current printer for performing the printing operation, when the printer unit constructed in said integrated computer and printer system is not selected by the operator.

9. The integrated computer and printer system of claim 1, further comprised of said computer unit containing a system main board supporting a central processing unit, an internal memory device for storing application programs including a power source management program, and an input/output interface for interfacing with a keyboard, auxiliary memory devices and the display unit.

10. The integrated computer and printer system of claim 9, further comprised of said printer unit containing an engine controller connected to the computer unit for controlling the printing operation.

11. The integrated computer and printer system of claim 10, further comprised of said computer unit operating the power source management program upon operation of a main power switch for managing power source of the computer unit, the display unit, and the printer unit by the steps of:

turning on the power source of the display unit and the engine controller of the printer unit when the operator turns on the main power switch;

determining whether the computer unit is in a power saving mode;

transmitting a power saving control signal to the engine controller of the printer unit to set the printer unit in the power saving mode, when the computer unit is in the power saving mode;

determining whether the computer unit is awaken under instruction of the operator while the computer unit is in the power saving mode;

determining whether the print command is input by the operator from said keyboard after the computer unit is awaken; and transmitting a wake-up control signal to the engine controller of the printer unit to wake up the engine controller for beginning the printing operation.

12. The integrated computer and printer system of claim 11, further comprised said computer unit automatically generating a power saving control signal for disabling the power supply to the engine controller of the printer unit and setting the printer unit in the power saving mode, when the computer unit has not been used for a predetermined time period.

13. The integrated computer and printer system of claim 10, further comprised of said printer unit managing the power source by the steps of:

initializing the printer unit when the operator turns on the main power switch;

setting the printer unit is a standby mode upon initialization;

determining whether the print command is received from the computer unit when the operator presses the print command from said keyboard after the printer unit is in the standby mode;

waking up the printer unit to perform the printing operation, when the print command is received from the computer unit, and returning to the standby mode;

determining whether a power saving control signal is received from the computer unit, when the print command is not received from the computer unit;

setting the printer unit in a power saving mode and awaiting for a next print command, when the power saving control signal is received from the computer unit;

determining whether a wake-up control signal is received from the computer unit for waking up the printer unit, when the power saving control signal is not received from the computer unit;

waking up the printer unit to perform the printing operation, when the wake-up control signal is received from the computer unit, and returning to the standby mode; and alternatively, setting the printer unit in a power source management mode in which, when the operator does not input the print command for a predetermined time period, the printer unit automatically sets to the power saving mode and awaits for the next print command.

14. The integrated computer and printer system of claim 10, further comprised of said printer unit managing the power source by the steps of:

initializing the printer unit when the operator turns on the main power switch;

setting the printer unit is a standby mode upon initialization;

determining whether a print command is received from the computer unit when the operator presses the print command from said keyboard after the printer unit is in the standby mode;

waking up the printer unit to perform the printing operation, when the print command is received from the computer unit, and returning to the standby mode;

determining whether a power saving control signal is received from the computer unit, when the print command is not received from the computer unit;

setting the printer unit in a power saving mode and awaiting for a next print command, when the power saving control signal is received from the computer unit;

determining whether a wake-up control signal is received from the computer unit for waking up the printer unit, when the power saving control signal is not received from the computer unit;

returning to await for the next print command, when the wake-up control signal is received from the computer unit; and alternatively, setting the printer unit in a power source management mode in which, when the operator does not input the print command for a predetermined time period, the printer unit automatically sets to the power saving mode and awaits for the next print command.

15. A method for managing a power source for an integrated computer and printer system having a monolithic, unitary structure containing therein a computer unit, a display unit, and a printer unit, said method comprising the steps of:

turning on the power source of the display unit and the printer unit when the operator turns on the main power switch;

determining whether the computer unit is in a power saving mode;

transmitting a power saving control signal to the printer unit to set the printer unit in the power saving mode, when the computer unit is in the power saving mode;

determining whether the computer unit is awaken under instruction of the operator while the computer unit is in the power saving mode;

determining whether the print command is input by the operator after the computer unit is awaken; and transmitting a wake-up control signal to the printer unit to wake up the printer unit for beginning the printing operation.

16. A method for managing a power source for an integrated computer and printer system having a monolithic, unitary structure containing therein a computer unit, a display unit, and a printer unit, said method comprising the steps of:

initializing the printer unit when an operator turns on the main power switch;

determining whether a print command is received from the computer unit when the operator presses the print command;

waking up the printer unit to perform printing operation, when the print command is received from the computer unit;

determining whether a power saving control signal is received from the computer unit, when the print command is not received from the computer unit;

setting the printer unit in a power saving mode, when the power saving control signal is received from the computer unit;

determining whether a wake-up control signal is received from the computer unit for waking up the printer unit;

waking up the printer unit to perform printing operation, when the wake-up control signal is received from the computer unit; and alternatively, setting the printer unit in a power source management mode in which, when the operator does not input the print command for a predetermined time period, the printer unit automatically sets to the power saving mode and awaits for the next print command.

17. In an integrated computer and printer system having a computer unit and an internal printer unit constructed in a monolithic, unitary housing, a method for selecting one of the internal printer unit of said integrated computer and printer system and an external printer unit connected to said integrated computer and printer system through an external interface port, comprising the steps of:

determining whether the external printer unit is connected to the external interface port of said integrated computer and printer system;

setting the internal printer unit constructed in said integrated computer and printer system as a current printer unit for printing a document, when the external printer unit is not connected to the external interface port of said integrated computer and printer system; and setting one of the internal printer unit and the external printer unit as the current printer unit for performing said printing of a document, when the external printer unit is connected to the external interface port of said integrated computer and printer system.

18. The method of claim 17, further comprised of providing a visual display of a message on a display unit of said integrated computer and printer system alerting an operator to select the current printer unit for performance of each said printing of a document, from among one of the internal printer unit constructed in said integrated computer and printer system and the external printer unit externally connected to said integrated computer and printer system.

19. The method of claim 17, comprised of designating one of the internal printer unit and the external printer unit as the current printer unit by:

determining first whether the internal printer unit is selected by the operator as the current printer unit;

setting the internal printer unit as the current printer unit for performing said printing of a document, when the internal printer unit is selected by the operator; and alternatively, automatically setting the external printer unit as the current printer unit for performing said printing of a document, when the internal printer unit has not been designated as said current printer.

20. The method of claim 18, comprised of designating one of the internal printer unit and the external printer unit as the current printer unit by:

determining whether the internal printer unit is selected by the operator as the current printer unit;

setting the internal printer unit as said current printer unit for performing said printing of a document, when the internal printer unit is selected by the operator; and alternatively, automatically setting the external printer unit as the current printer unit for performing said printing of a document, when the internal printer unit has not been designated as said current printer.

21. The integrated computer and printer system of claim 12, further comprised of said computer unit comprising an inner interface card connected to said printer unit for controlling said printer unit to perform said printing operation directly under instruction of the operator, an outer interface card connectable to an external printer unit separated from said integrated computer and printer system for enabling said external printer unit to perform said printing operation when the operator selects said external printer unit for printing a desired document, and said computer unit selecting one of said printer unit and said external printer unit for performing each printing operation by:

determining whether the external printer unit is connected to the external interface port of said integrated computer and printer system;

setting the printer unit constructed in said integrated computer and printer system as a current printer unit for printing a document, when the external printer unit is not connected to the external interface port of said integrated computer and printer system; and setting one of the printer unit and the external printer unit as the current printer unit for performing said printing of said document, when the external printer unit is connected to the external interface port of said integrated computer and printer system.

22. The integrated computer and printer system of claim 21, further comprised of said computer unit providing a visual display of a message on a display unit of said integrated computer and printer system to alert the operator to select the current printer unit for performance of each said printing of said document, from among one of the printer unit constructed in said integrated computer and printer system and the external printer unit connected externally to said integrated computer and printer system.

23. The integrated computer and printer system of claim 21, further comprised of said computer unit designating one of the printer unit and the external printer unit as the current printer unit by:

determining first whether the printer unit constructed in said integrated computer and printer system is selected by the operator as the current printer unit;

setting the printer unit as the current printer unit for performing said printing of a document, when the printer unit constructed in said integrated computer and printer system is selected by the operator; and alternatively, automatically setting the external printer unit as the current printer unit for performing said printing of a document, when the printer uni constructed in said integrated computer and printer system has not been designated as said current printer.

24. The integrated computer and printer system of claim 22, further comprised of said computer unit designating one of the printer unit and the external printer unit as the current printer unit by:

determining whether the printer unit constructed in said integrated computer and printer system is selected by the operator as the current printer unit;

setting the printer unit as said current printer unit for performing said printing of a document, when the printer unit constructed in said integrated computer and printer system is selected by the operator; and alternatively, automatically setting the external printer unit as the current printer unit for performing said printing of a document, when the printer unit constructed in said integrated computer and printer system has not been designated as said current printer.

25. The integrated computer and printer system of claim 13, further comprised of said computer unit comprising an inner interface card connected to said printer unit for controlling said printer unit to perform said printing operation directly under instruction of the operator, an outer interface card connectable to an external printer unit separated from said integrated computer and printer system for enabling said external printer unit to perform said printing operation when the operator selects said external printer unit for printing a desired document, and said computer unit selecting one of said printer unit and said external printer unit for performing each printing operation by:

determining whether the external printer unit is connected to the external interface port of said integrated computer and printer system;

setting the printer unit constructed in said integrated computer and printer system as a current printer unit for printing a document, when the external printer unit is not connected to the external interface port of said integrated computer and printer system; and setting one of the printer unit and the external printer unit as the current printer unit for performing said printing of said document, when the external printer unit is connected to the external interface port of said integrated computer and printer system.

26. The integrated computer and printer system of claim 25, further comprised of said computer unit providing a visual display of a message on a display unit of said integrated computer and printer system to alert the operator to select the current printer unit for performance of each said printing of said document, from among one of the printer unit constructed in said integrated computer and printer system and the external printer unit connected externally to said integrated computer and printer system.

27. The integrated computer and printer system of claim 14, further comprised of said computer unit comprising an inner interface card connected to said printer unit for controlling said printer unit to perform said printing operation directly under instruction of the operator, an outer interface card connectable to an external printer unit separated from said integrated computer and printer system for enabling said external printer unit to perform said printing operation when the operator selects said external printer unit for printing a desired document, and said computer unit selecting one of said printer unit and said external printer unit for performing each printing operation by:

determining whether the external printer unit is connected to the external interface port of said integrated computer and printer system;

setting the printer unit constructed in said integrated computer and printer system as a current printer unit for printing a document, when the external printer unit is not connected to the external interface port of said integrated computer and printer system; and setting one of the printer unit and the external printer unit as the current printer unit for performing said printing of said document, when the external printer unit is connected to the external interface port of said integrated computer and printer system.

28. The integrated computer and printer system of claim 27, further comprised of said computer unit providing a visual display of a message on a display unit of said integrated computer and printer system to alert the operator to select the current printer unit for performance of each said printing of said document, from among one of the printer unit constructed in said integrated computer and printer system and the external printer unit connected externally to said integrated computer and printer system.

29. The integrated computer and printer system of claim 13, further comprising a blowing fan installed in the side wall of said unitary housing for generating an air current flowing along a direction substantially perpendicular to the photosensitive drum, when said back cover is closed to cover said unitary housing, and said paper cassette of said printer unit being detachably installed between said computer unit and said display unit for containing a stack of recording paper.

30. The integrated computer and printer system of claim 14, further comprising a blowing fan installed in the side wall of said unitary housing for generating an air current flowing along a direction substantially perpendicular to the photosensitive drum, when said back cover is closed to cover said unitary housing, and said paper cassette of said printer unit being detachably installed between said computer unit and said display unit for containing a stack of recording paper.

* * * * *